United States Patent [19]

Noonan et al.

[11] Patent Number: 5,076,938

[45] Date of Patent: Dec. 31, 1991

[54] OIL TREATMENT METHOD

[76] Inventors: William R. Noonan, R.R. 31, 565 Briardean Road, Cambridge, Ontario, Canada, N3H 4R6; Thomas K. McDowell, 46 Parkside Dr., Dundas, Ontario, Canada, L9H 2S7

[21] Appl. No.: 592,394

[22] Filed: Oct. 3, 1990

Related U.S. Application Data

[63] Continuation-in-part of Ser. No. 412,734, Sep. 26, 1989, abandoned.

[51] Int. Cl.$^5$ ............................................. B01D 17/05
[52] U.S. Cl. ................................... 210/708; 210/717; 210/726; 210/727; 210/751; 210/925
[58] Field of Search ............... 210/708, 717, 726, 727, 210/749, 751, 925

[56] References Cited

U.S. PATENT DOCUMENTS

| | | | |
|---|---|---|---|
| 3,577,340 | 5/1971 | Paviak et al. | 210/925 |
| 3,639,255 | 2/1972 | Boardman et al. | 210/925 |
| 3,843,306 | 10/1974 | Whittington et al. | 210/680 |
| 4,197,197 | 4/1980 | Abaeva et al. | 210/925 |
| 4,256,578 | 3/1981 | Kozar | 210/766 |
| 4,518,506 | 5/1985 | Green et al. | 210/749 |

Primary Examiner—Stanley S. Silverman
Assistant Examiner—Krisanne Shideler
Attorney, Agent, or Firm—Rogers, Bereskin & Parr

[57] ABSTRACT

What is disclosed is a method of encapsulating hydrocarbon systems with the combination of an emulsifier solution and a reactive silicate solution. The method comprises the addition of an emulsifier solution to a hydrocarbon, for example, crude oil, then adding the reactive silicate solution to the emulsifier solution and hydrocarbon mix. Upon adding the reactive silicate solution the mix changes to a thick gel consisting of agglomerates of microspheres having typical diameters of 2 to 4 micrometers and less. The agglomerates are only loosely bound and the microspheres are easily dispersable into individual entities. Upon drying the wet gel yields a free-flowing powder. The encapsulation does not chemically alter or degrade the oil in any way.

7 Claims, 13 Drawing Sheets

OIL TREATMENT METHOD

This application is a continuation-in-part of application Ser. No. 412,734, filed Sept. 26, 1989, now abandoned.

FIELD OF THE INVENTION

This invention relates to a method for encapsulating hazardous waste, and in particular, to a method of treating accidentally spilled hydrocarbons.

BACKGROUND OF THE INVENTION

The accidental spillage of hydrocarbons with the resulting environmental damage unfortunately is a fairly common occurrence. However, as yet there has been no completely satisfactory method of retaining and retrieving spilled hydrocarbons. The most visible use of such methods has been in the "clean up" operations following large volume crude oil spills from sea-going oil tankers. Efforts to deal with such spills have included containment using floating booms and subsequent attempts to separate the contained oil from sea water using various methods. However, such booms are generally only effective in relatively calm weather and known separation processes are relatively slow and unsuitable for dealing with large volume oil spills.

It has long been known that surfactants, dispersants and wetting agents have the ability to emulsify hydrocarbons in varying degrees. This fact has been put to use historically to aid in the removal of hydrocarbons from, for example, beaches and also for example, to assist in the dispersal of hydrocarbons spilled upon open waters.

The teachings of the U.S. Pat. Nos. 3,577,340 to Paviak, May 4, 1971; 3,639,255 to Boardman, Feb. 1, 1972; and 4,197,197 to Abaeva, Apr. 8, 1980, disclose various novel surfactants that have utility in dissisipating oil films or spills in open water. As a method for remediation of oil spills, the use of surfactants, as described in the documents listed above, may only dilute the oil and does not eliminate or remove it. There is, in fact, considerable evidence that the chemically dispersed or emulsified hydrocarbons are more toxic to crustaceans and fish than the original undispersed hydrocarbon.

When spilled crude oil is washed ashore, the removal of the oil becomes even more difficult. In some circumstances the soiled beach material is simply removed. Where this is impractical, for example, on rocky beaches, the conventional method of cleaning involves the use of high pressure steam or water to wash the oil from the shore, although this method is slow and labour intensive, and still relatively ineffective.

The use of silica or silicate for remediation of hydrocarbon spills is also known, for example, Whittington et al., in U.S. Pat. No. 3,843,306, of Oct. 22, 1974, discloses the use of a surface treated, urethane foam-like, silicate foam that absorbs, amongst other things, hydrocarbons.

Kozar, in U.S. Pat. No. 4,256,578 of Mar. 17, 1981, discloses the use of metasilicates to reclaim used oil by adjusting the pH of an oil/water mixture and heating, thereby solubilizing the oil contaminants in the aqueous phase and thus allowing the oil to be re-used.

Black et al., in U.S. Pat. No. 4,518,506, of May 21, 1985, describes the use of a surface treated, expanded silicate aggregate for the absorption of floating oils from water.

All of the above uses of silicates or silicas rely simply on physical absorption or pH adjustment.

SUMMARY OF THE INVENTION

According to the present invention there is provided a method for the encapsulation of hydrocarbons to produce a material which is easily contained and can be collected and can be removed from a spillage site. The method comprises contacting the hydrocarbon with an emulsifier solution, followed by contacting the resultant mixture with a silicate solution. The emulsifier breaks up the hydrocarbon into very small droplets and the silicate locks the oil droplets into an amorphous silica based shell and forms an immobile gel that dries to a fine, free-flowing powder.

BRIEF DESCRIPTION OF THE DRAWINGS

This and other aspects of the invention will now be described, by way of example, with reference to the accompanying drawings which illustrate test results obtained from various samples resulting from carrying out the method in accordance with the present invention.

DETAILED DESCRIPTION OF THE PREFERRED EMBODIMENTS

Figure 1:
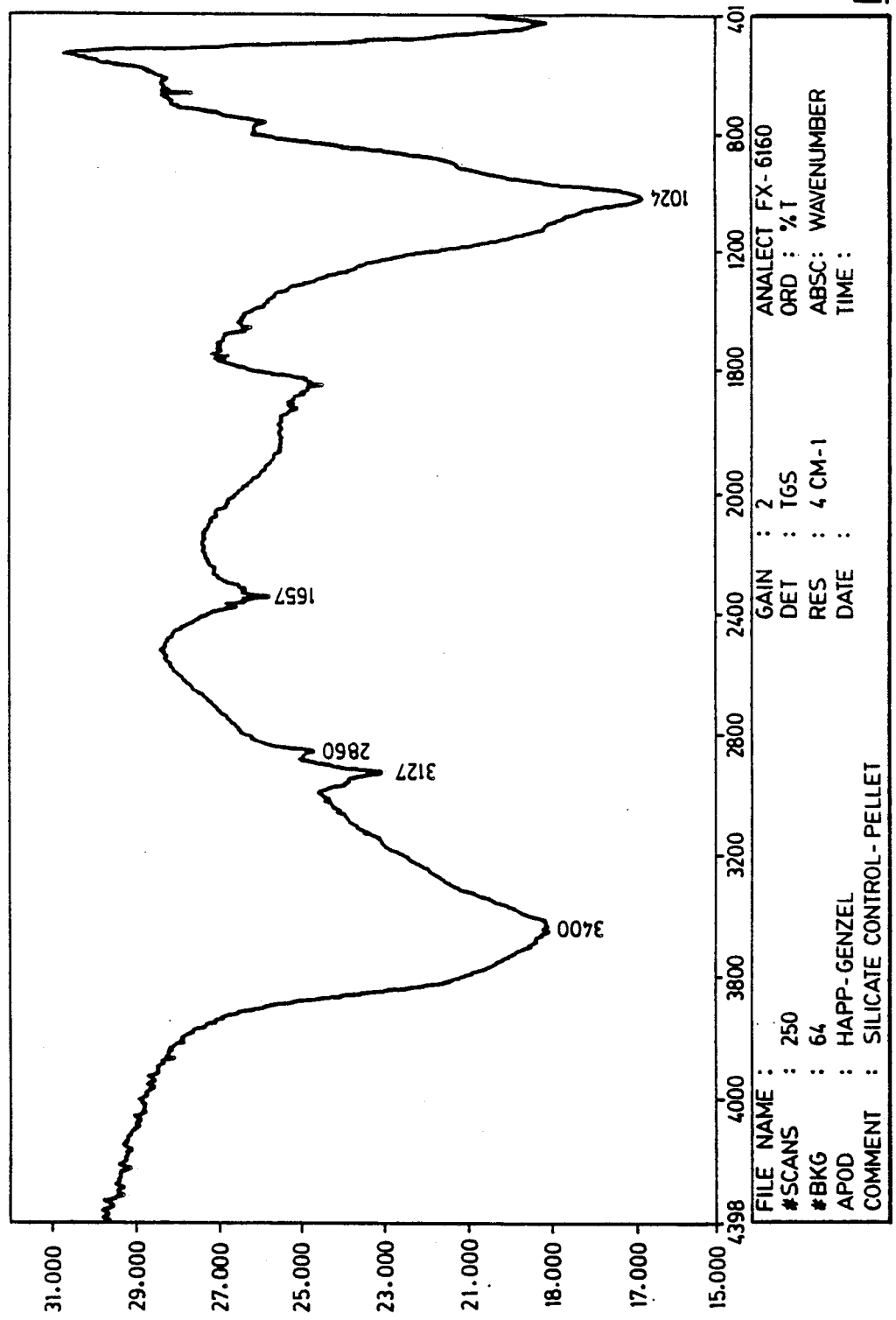

The method of the present invention involves the treatment of hydrocarbon or oil systems with an emulsifying or dispersing solution to emulsify/solubilize the oil followed by a silicate solution to neutralize/immobilize the resultant acidic mixture. The method may be used for clean-up procedures in emergency hydrocarbon spill and contamination procedures. The emulsifier can be a blend of organic acids, inorganic acids, emulsifiers, wetting agents, surfactants and dispersants.

A preferred emulsifier has the following composition:

| | |
|---|---|
| Phosphoric Acid | 30% |
| Citric Acid | 8% |
| Sodium Chloride | 4% |
| Nonyl Phenol Ethoxylate | 5% |
| Sodium Dodecyl Benzene Sulfonic Acid | 6% |
| Linear Alcohol Ethoxylate | 4% |
| Phenyl Glycol Ether | 3% |
| Water | 40% |

The emulsifier can be applied at a range of dilution from concentrated solution up to a ratio of 30:1 with water

| | |
|---|---|
| Citric Acid | 12.5% |
| Nonyl Phenol Ethoxylate | 10.0% |
| Ethoxylated Sorbitan Monooleate (20 E.O) | 8.0% |
| Ethoxylated Sorbitan Monooleate (5 E.O) | 14.0% |
| Hexylene Glycol | 8.0% |
| Water | to 100% |

Still another preferred emulsifier has the following composition:

| | |
|---|---|
| Citric Acid | 14.0% |
| Hexylene Glycol | 12.0% |
| N-Methyl Pyrrilidone | 5.0% |
| di-basic esters | 12.0% |
| Phenyl Glycol Ether | 5.0% |
| Water | to 100% |

The latter composition has particular utility in situations where use of surfactants or wetting agents would present a problem or are prohibited from use.

A preferred silicate has the following composition:

| | |
|---|---|
| Potassium or Sodium Silicate | 33–58% |
| Waterglass solution | .01 to 2.0% |
| Aluminum Trihydrate | .01 to 2.0% |
| Titanium | .01 to 2.0% |
| Glycol | 1.0 to 4.0% |
| Water | Balance |

The silicate is applied at a range of dilutions from concentrated solution up to a ratio of 30:1 with water.

The results of using the method may be summarized as set out below:

Treatment of the oil with emulsifier very rapidly breaks up the oil into very small droplets. Subsequent application of the silicate solution virtually immediately locks in the oil droplets into silica-based shells, which, on a large scale, appear as a wet gel. The gel consists of agglomerates of microspheres (oil encapsulated within silica-based walls) having typical diameters of 2 to 4 micrometers and less. The agglomerates are only loosely bound and the microspheres are easily dispersable into individual entities.

The resultant wet gel can be dried to yield a free-flowing powder, and test results indicate that the treatment does not chemically alter or degrade the oil in any way.

Applications of the disclosed clean-up treatment procedure include: solidifaction of heavy oil, coal tar, kerosene and aviation fuel as an emergency spill control measure for either in-plant or topical applications; treatment of soils in the vicinity of leaking storage tanks, or otherwise contaminated soils; and remediation treatment of contaminated waters.

To demonstrate the potential uses for the method of the present invention, there follows a number of examples of applications of the method.

EXAMPLE 1

A small aliquot of a commercially available coal tar was treated with an excess of the first-mentioned emulsifier solution. Immediately upon addition of the emulsifier solution to the coal tar, a cloudy solution containing fine black particles, thought to be carbon, formed. The reaction indicated rapid solubilization/emulsification of the coal tar. This acidic solution was then treated with the silicate solution to obtain a grey/black gel-like precipitate.

A portion of this gel-like material was dried at ambient temperature under vacuum. The still wet gel, the dried gel and a portion of the original untreated coal tar were subjected to the Province of Ontario, Canada, Ministry of the Environment, Regulation 309, Leachate Testing, the results of which are indicated below:

| | Poly Aromatic Hydrocarbon ... (PAH) Leachate Analysis Coal Tar Concentration - UG/ML (PPM) | | |
|---|---|---|---|
| COMPOUNDS | UNTREADED CONTROL | TREATED DRY GEL | TREATED WET GEL |
| Naphthalene | 143.3 | 0.10 | 0.722 |
| Methyl Naphthalene | 60.6 | 0.04 | N.D. |
| Methyl Naphthalene | 66.5 | 0.05 | N.D. |
| 2 Ethyl Naphthalene | 45.7 | <0.01 | N.D. |
| 1,3, Dimethyl Naphthalene | 16.5 | <0.01 | N.D. |
| 1,2, Dimethyl Naphthalene | 6.3 | <0.01 | N.D. |
| Acenaphthylene | 36.1 | <0.01 | 0.007 |
| 1,2, Dihydroacenaphthylene | 262.7 | 0.24 | N.D. |
| Isocyanonaphthalene | 133.8 | 0.13 | N.D. |
| Naphthalene Isocyanato | 45.6 | <0.01 | N.D. |
| Naphthalene (Substituted) | 9.9 | <0.01 | N.D. |
| 9H Fluorene | 210.0 | 0.20 | 0.110 |
| Naphthalene (Substituted) | 13.7 | <0.01 | N.D. |
| Phenanthrene | 230.0 | 0.24 | 0.126 |
| Phenanthridine | 153.4 | 0.20 | N.D. |
| Methyl Acridine | 15.8 | <0.01 | N.D. |
| Methyl Carbazole | 16.4 | <0.01 | N.D. |
| Phenathrene (Substituted) | 40.9 | 0.04 | N.D. |
| Methyl Carbazole | 16.7 | <0.01 | N.D. |
| Fluorenamine | 33.5 | <0.01 | N.D. |
| Anthracenidiane | 28.6 | 0.06 | N.D. |
| Fluoranthene | 22.7 | 0.03 | 0.016 |
| Anthracene Carbonitrile | 17.6 | 0.05 | N.D. |
| Phenanthridinane | 92.2 | 0.09 | N.D. |
| Totals | 1667.0 UG/ML (PPM) | 1.49 UG/ML (PPM) | 1.121 UG/ML (PPM) |

Note: A) Detection limit for Benzo
(A) Pyrene <1.0 PPM
B) N.D. = Not detected <.001 PPM)

Chemical analysis of the dried "gel" was also conducted and the results of which are presented below:

| CHEMICAL ANALYSIS OF COAL TAR GEL (Dry) | |
|---|---|
| | Wt % |
| $SiO_2$ | 31.68 |
| $Al_2O_3$ | 0.60 |
| $Fe_2O_3$ | <0.01 |
| CaO | 0.06 |
| MgO | 0.01 |
| $Na_2O$ | 0.92 |
| $K_2O$ | 13.38 |
| $TiO_2$ | 0.03 |
| Loss on Ignition | 53.18 |

-continued

CHEMICAL ANALYSIS OF COAL TAR GEL (Dry)

| | Wt % |
|---|---|
| TOTAL | 99.86 |

Chemical analysis results show that the "gel" is comprised, for the most part, of silica and potassium compounds with minor sodium content. The high loss on ignition value suggests a substantial level of volatiles are present, probably due to the hydrocarbon components.

EXAMPLE 2

A small aliquot of kerosene gas oil was treated with an excess of the first-mentioned emulsifier solution. As with the coal tar, immediately upon addition a cloudy solution, indicative of solubilization/emulsification was obtained. Subsequent treatment with the silicate solution resulted in the immediate formation of a gel-like precipitate. Again, a portion of this was allowed to dry.

Chemical analysis results for the dried "gel" presented below, shows the major components to be silica and potassium compounds with minor sodium content:

| CHEMICAL ANALYSIS OF KEROSENE OIL GEL (Dry) | |
|---|---|
| | Wt % |
| $SiO_2$ | 22.84 |
| $Al_2O_3$ | 0.03 |
| $Fe_2O_3$ | <0.01 |
| CaO | 0.01 |
| MgO | 0.01 |
| $Na_2O$ | 0.84 |
| $K_2O$ | 9.92 |
| $TiO_2$ | 0.01 |
| Loss on Ignition | 66.80 |
| TOTAL | 100.46 |

The oil and grease leachate analysis results are presented in the table below and demonstrate somewhat higher values than that for the coal tar. However, these values are still well below the regulatory guideline levels allowed for open water disposal operations:

| Regulation 309 Leachate Testing Results | |
|---|---|
| | Oil and Grease mg/l |
| Kerosene Oil Gel (Wet) | 176.0 |
| Kerosene Oil Get (Dry) | 22.6 |

EXAMPLE 3

Waste (used) motor oil, the first-mentioned emulsifier (surfactant) solution described above, and the preferred reactive silicate solution described above were used for sample preparation and subsequent analysis.

Treatment of the oil sample was carried out as follows: first, equal volumes (10 ml) of oil and surfactant were mixed in a glass beaker. On addition of the surfactant, it was noted that the mixture became very fluid and that the oil appeared to be breaking up into small droplets.

The mixture was well stirred. At that point, 10 ml of the reactive silicate solution was added. The beaker contents changed almost immediately to a very thick gel.

A portion of the gel was dried overnight in a vacuum oven under ambient temperatures. The dried gel was highly friable and could easily be broken up into a free-flowing powder. Subsequent chemical analysis were carried out on the dried gel.

Control samples of the emulsifier and silicate solutions were prepared by drying portions of them overnight in a vacuum oven at 40° C. to obtain their non-volatile solids.

The analytical procedures used are described below:

A portion of the dried gel was subjected to extraction using Hexane as the solvent. The extract was stripped of its solvent and the residue was smeared onto a KBr disc for infrared (IR) analysis. A second portion of the residue was analyzed using size exclusion chromatography.

The non-extractable portion of the dried gel was dried overnight and subjected to analysis using X-ray Diffractometry and Scanning Electronic Microscopy (SEM) in conjunction with an Energy Dispersive X-ray Analysis (EDXA) attachment. The latter provides relative levels of all elements of atomic number equal to or greater than 11 (sodium) in the sample.

Another portion of the vacuum dried gel was ashed at 750° C. for 20 hours to isolate the inorganic (non-oil) components. The ashed sample was analyzed using X-ray Diffraction and SEM-EDXA.

For infrared analysis: dry powder samples were blended with potassium bromide (KBr) and pressed into pellets. Liquid samples were analyzed as thin films or KBr discs.

The ashed residue of the dried gel was pelletized and analyzed for all elements with atomic number greater than eight using a Philips PW-1410 X-ray Spectrometer.

Residual water in the dried gels was determined using Karl-Fischer titration.

A Waters GPC-II chromatograph was used to determine changes in molecular weight distributions of the oils before and after treatment. Samples of oil before treatment and extracted from the dried gels after treatment were analyzed.

The results of the above analysis are discussed below:

Infrared Spectrum 1 (FIG. 1) is of the non-volatile residue obtained from the dried silicate solution The broad absorbances at 3400 and 1657 wavenumbers are most likely due to residual water. The broad, featureless absorbance band centered at about 1024 wavenumbers is typical of many silica based materials.

Figure 2:
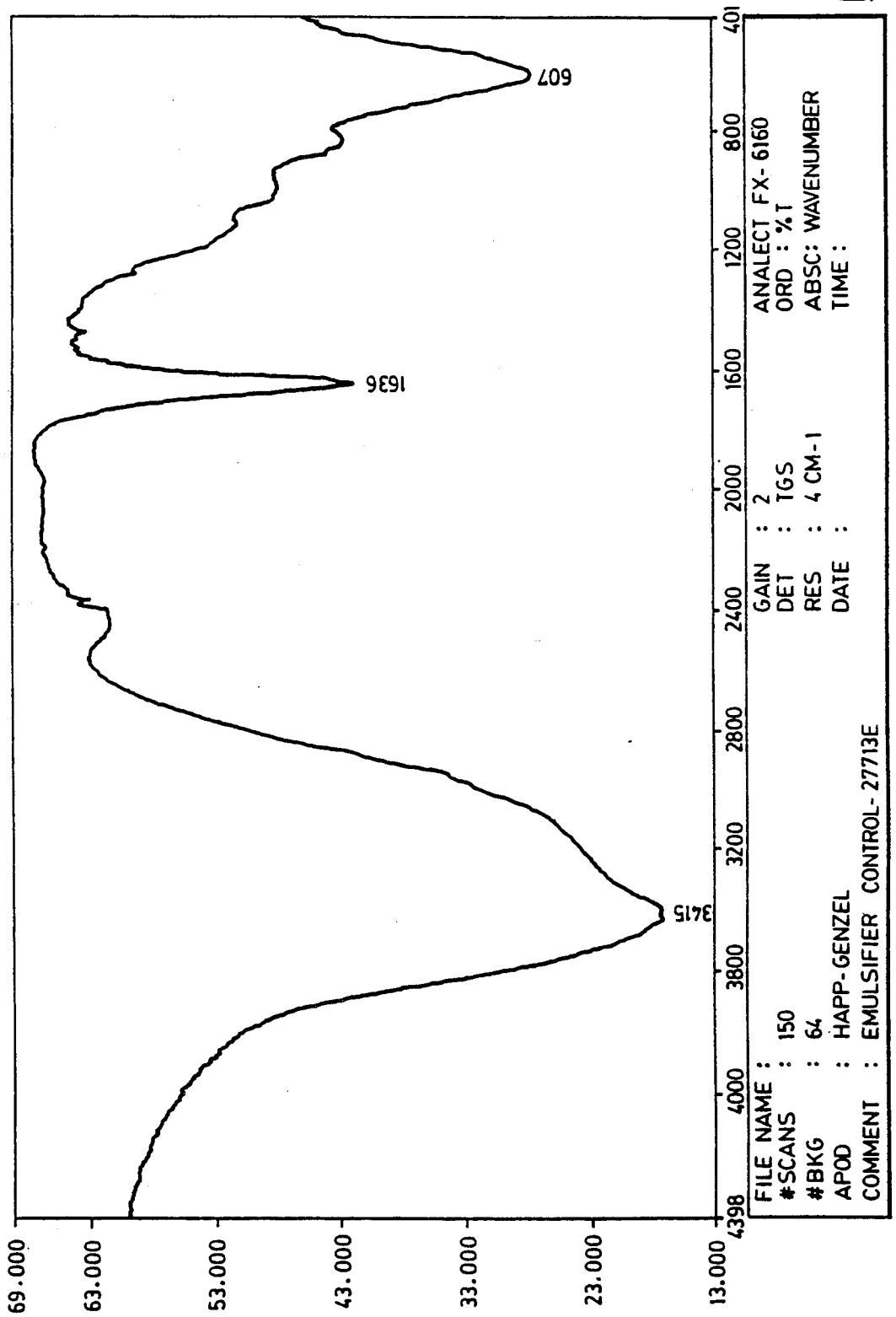

Infrared spectrum 2 (FIG. 2) is of the non-volatile portion of the emulsifier solution obtained after drying. It was useful in the interpretation of subsequent spectra.

Figure 3:
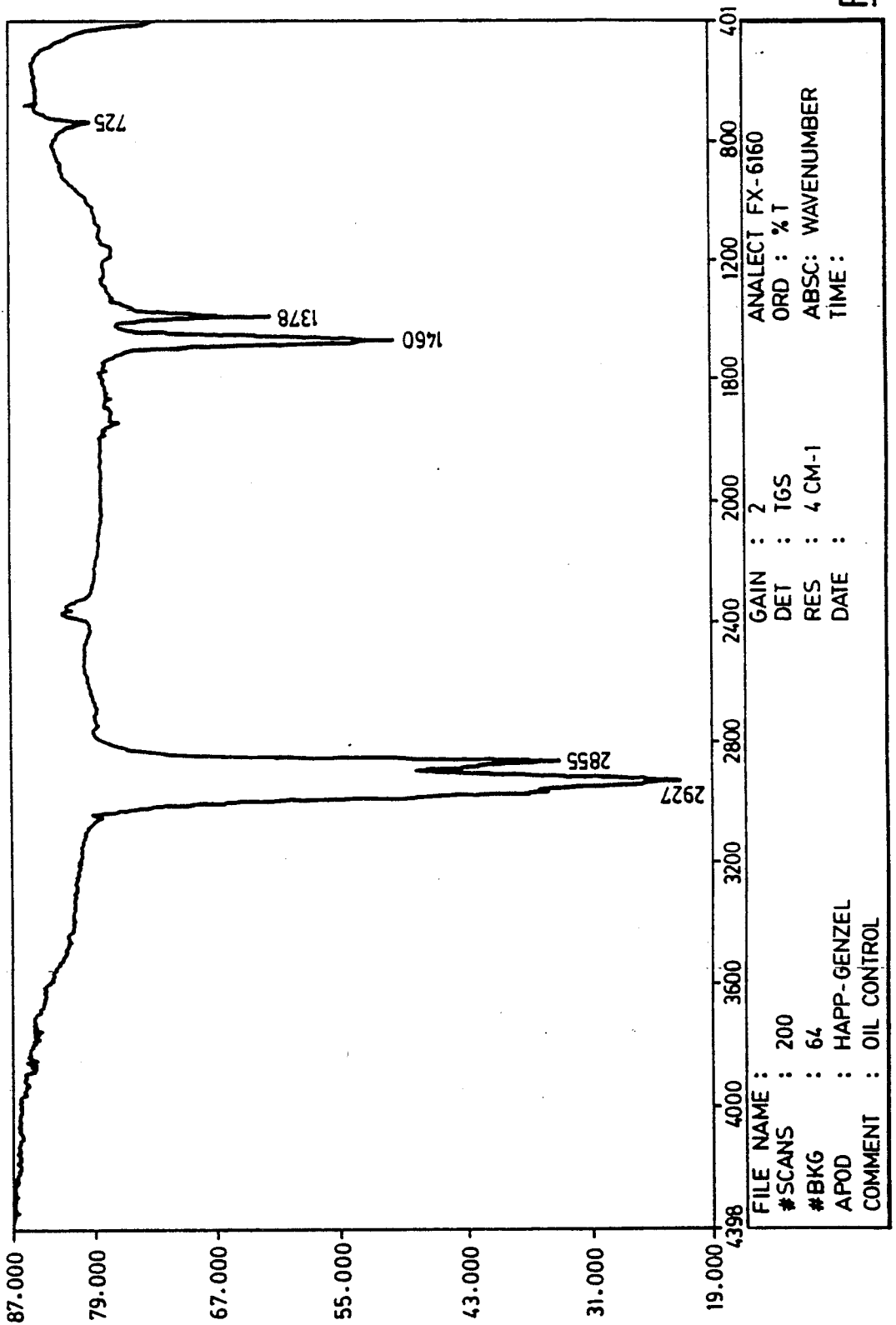

Infrared spectrum 3 (FIG. 3) is of the oil sample, as received. It is typical on a highly branched aliphatic hydrocarbon. Very small absorbances in the 1750 wavenumber region suggest a degree of thermo-oxidative degradation has occurred as would be expected with a used oil.

Figure 4:
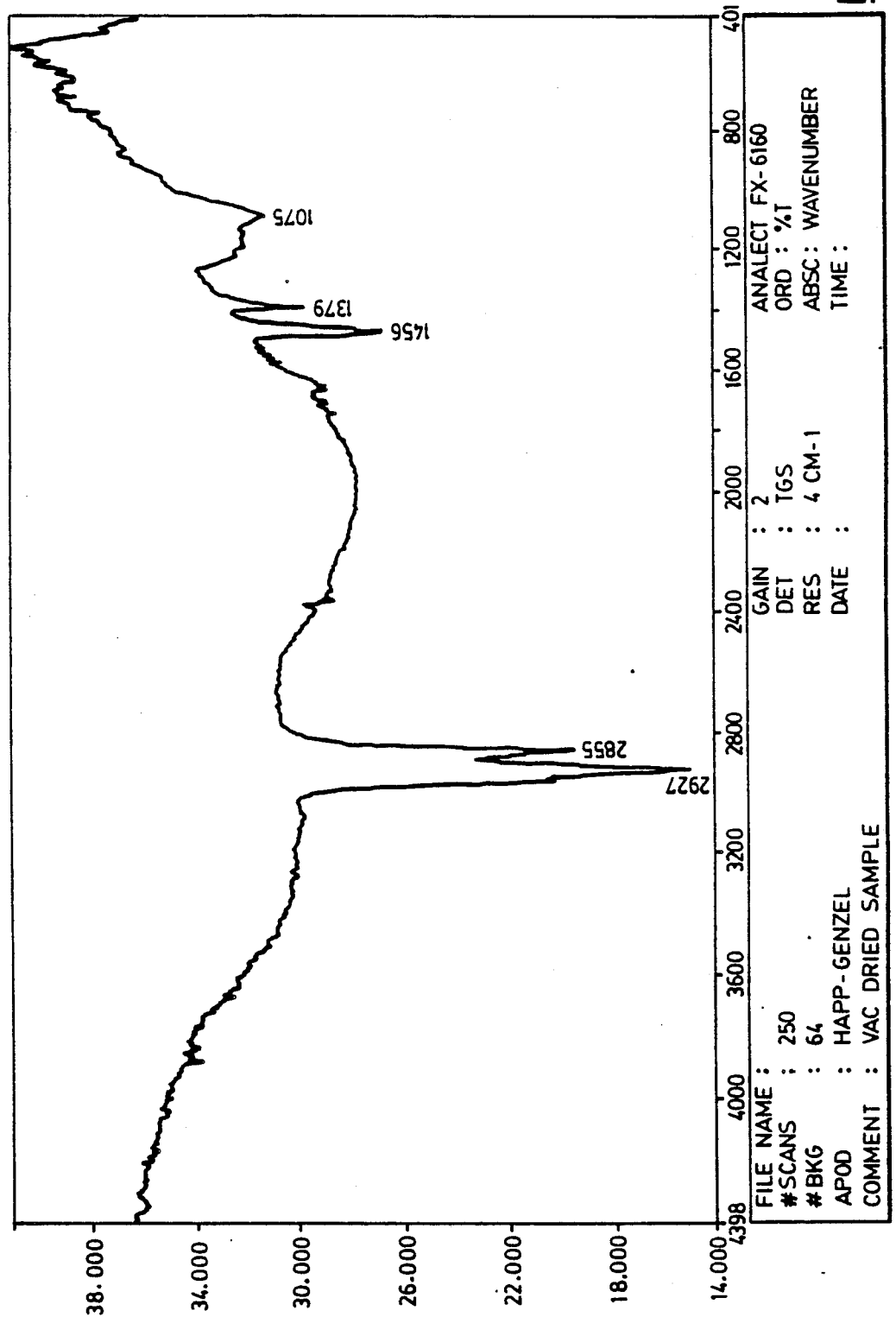

Infrared spectrum 4 (FIG. 4) is of the dried gel obtained after treatment of the oil with emulsifier and silicate solutions. The absorbance bands due to the oil are clearly seen at 2927, 2855, 1456 and 1379 wavenumbers. In addition, a broad featureless absorbance band centred at about 1075 wavenumbers typical of silica based substances is observable.

Figure 5:
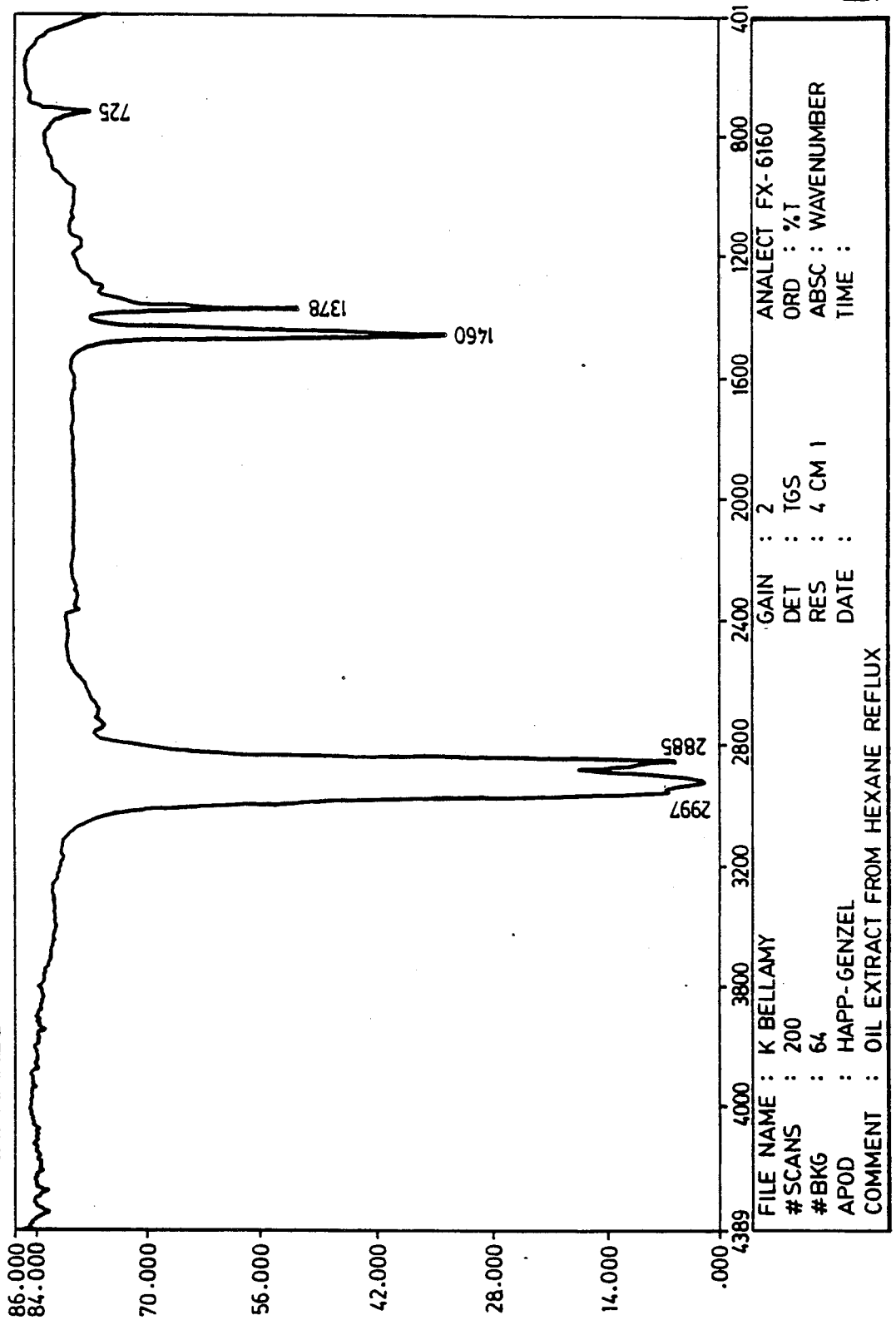

The infrared spectrum of the oil recovered from the dried gel by solvent extraction is seen in Infrared Spectrum 5 (FIG. 5). It is identical to Spectrum 3 of the oil before treatment and clearly indicates the latter does not lead to any chemical degradation or conversion of the oil. Since the dried gel is a free-flowing powder, this suggests that the oil is trapped within an inorganic silica based shell which isolates it completely.

Figure 6:
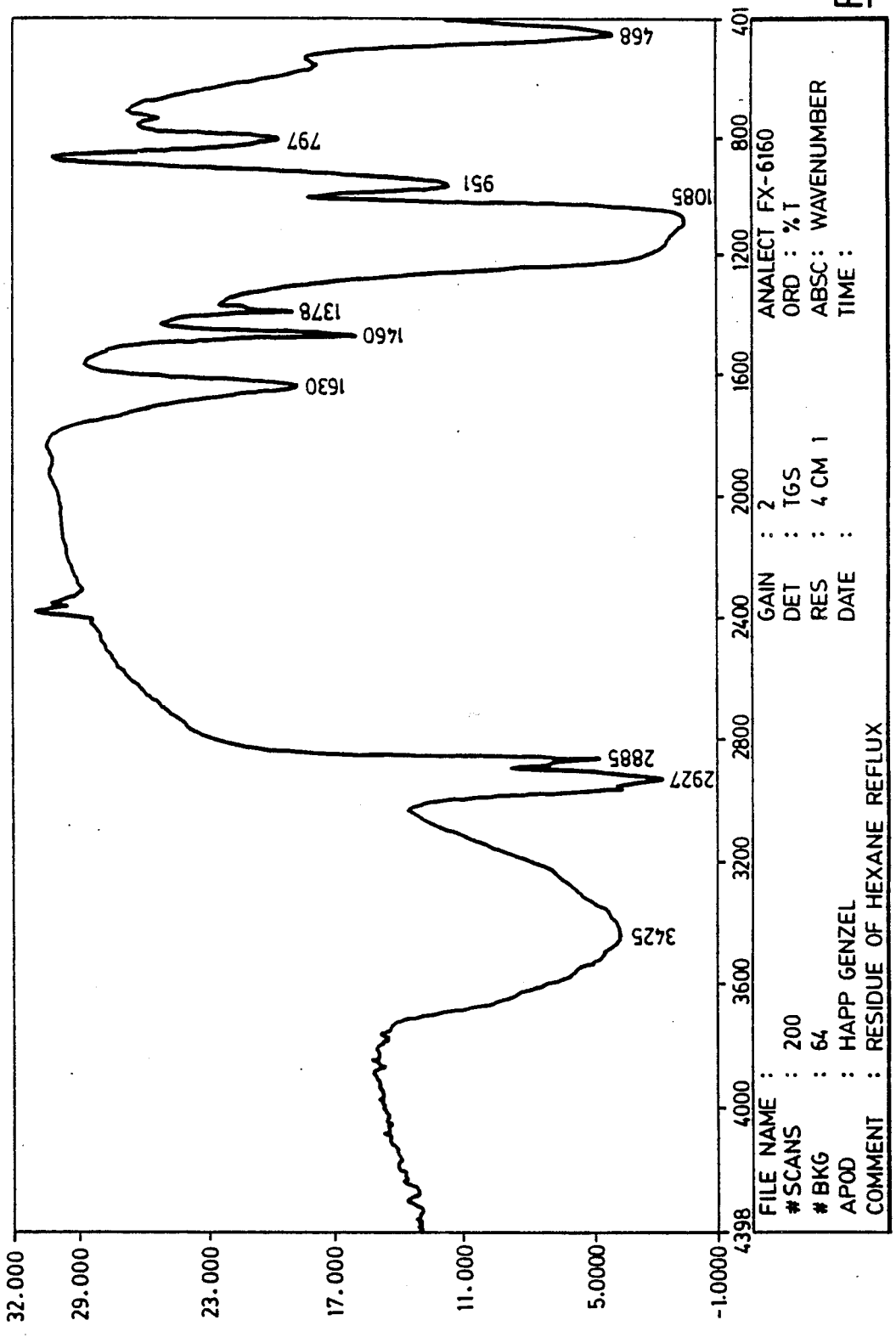

Following hexane extraction of the dried gel to remove the trapped oil, the residue from the gel was dried. Infrared spectrum 6 (FIG. 6) is of this residue. The broad absorbance at 1085 wavenumbers is typical of silica based materials. Bands at 2927, 2855, 1460 and 1378 wavenumbers are typical of oil and indicate that not all of the oil was extracted. A portion of the oil remains very tightly bound in the silica matrix.

The infrared spectra of untreated and extracted oils clearly indicates no gross changes in the chemical composition of the oil occurs during treatment. In order to assess whether any breakdown of the size of the oil molecules took place, size exclusion chromatography (SEC) was carried out.

Figure 7:
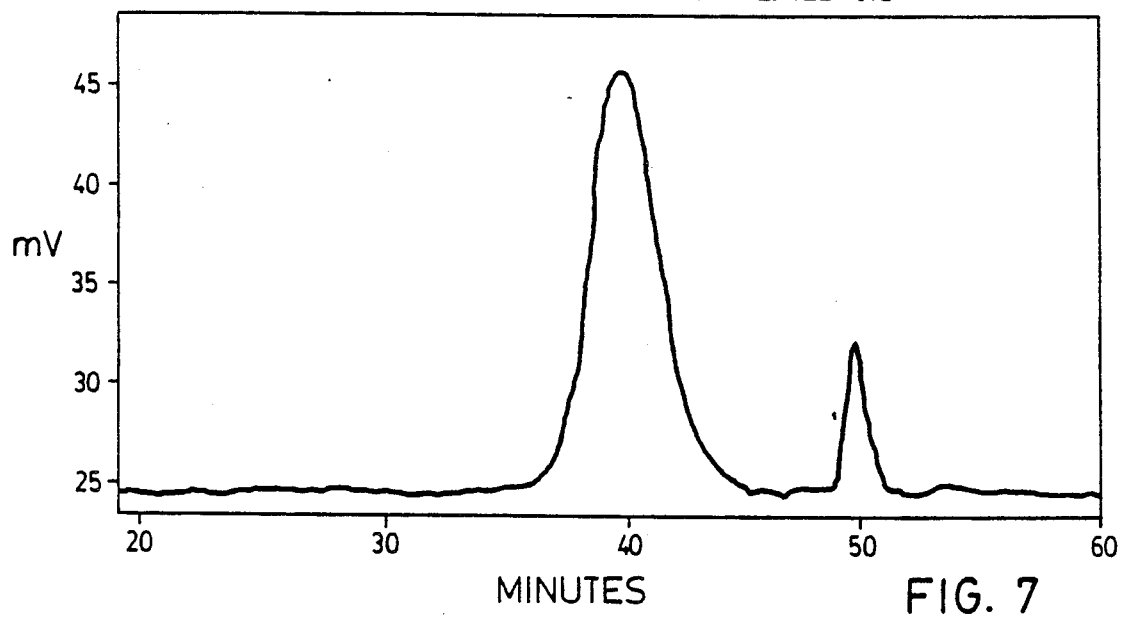
Figure 8:
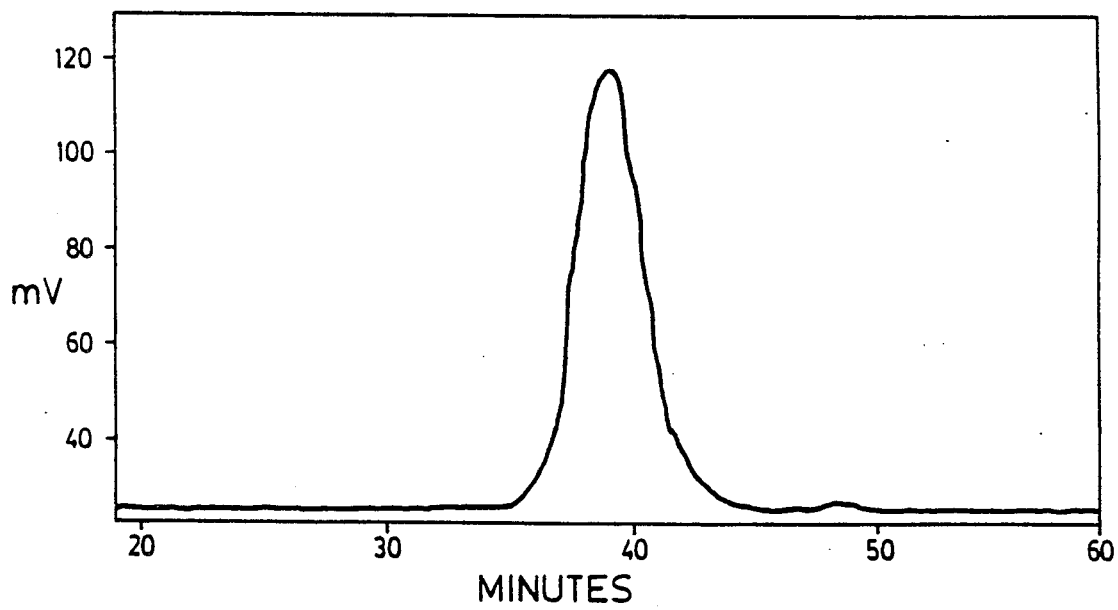

Chromatographs SEC 1 and 2 (FIGS. 7 and 8) are of the untreated oil and hexane extraction recovered oils, respectively, using a differential refractive index detector. The chromatographs are essentially identical with the exception that the untreated oil has a slightly longer average retention time indicating that it has a slightly lower average molecular weight.

The difference is explainable on the basis of the lower molecular weight fraction of the oil being too tightly bound in the silica matrix to be extracted with the procedure used in this study. This is not unexpected and is supported by Infrared Spectrum (see above) which clearly shows oil residues in an essentially silica based matrix.

Figure 9:
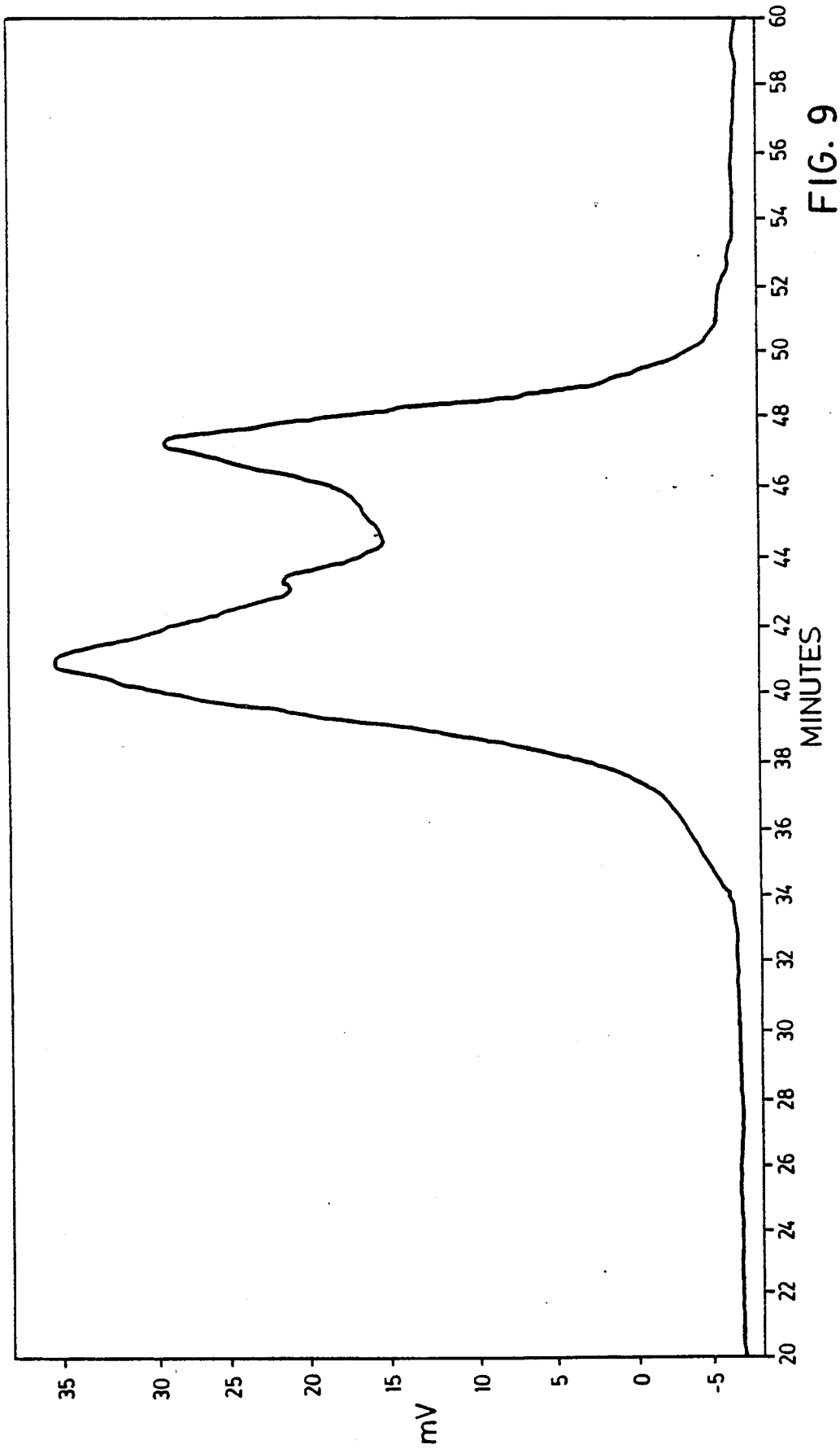
Figure 10:
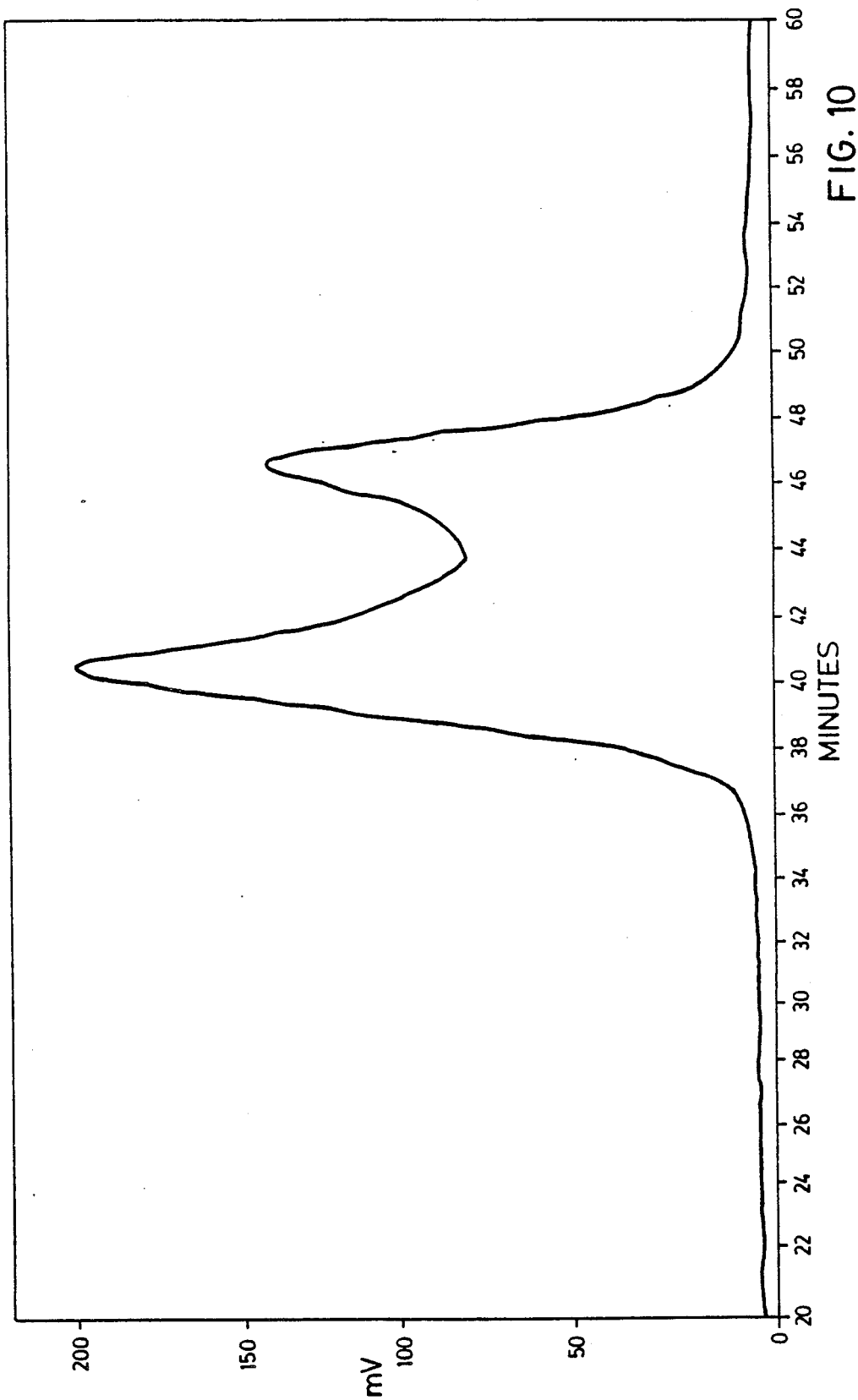

Similar results are seen by using a UV detector (set at 254 nm) on the size exclusion chromatograph. These are shown as scans SEC 3 and 4 (FIGS. 9 and 10) for the untreated and hexane recovered oils, respectively. Again, the average retention time of the former is slightly longer than that of the latter indicating that the untreated oil has a slightly lower average molecular weight.

X-ray fluorescence spectroscopy was carried out on the dried gel, the gel residue after extraction of the oil with hexane and on an ashed sample of the latter. The major elements detected were silicon, chlorine and potassium which were all present at levels of 10% or more. Calcium was detected at about 1% to 2% while all other elements were present in only trace quantities. Typical results (for the ashed residue from the extraction) are given below.

A search was made for all elements with atomic number greater than 8. Approximates (weight:%) are given below for all elements detected. Elements not listed were not detected in the sample:

| Sodium | 0.27 | Potassium | >10 |
|---|---|---|---|
| Magnesium | 0.15 | Calcium | 1-2 |
| Aluminium | 0.19 | Titanium | 0.01 |
| Silicon | >10 | Chromium | 0.09 |
| Phosphorus | 0.11 | Iron | 0.02 |
| Sulphur | 0.05 | Nickel | 0.29 |
| Chlorine | >10 | Copper | <0.01 |
| Zinc | 0.11 | Bromide | <0.01 |
| Barium | 0.01 | Lead | 0.07 |

X-ray diffractometry on the above three samples indicated that the major crystalline component in all cases was potassium chloride (KCl). The ashed sample also contained 5% of cristobalite ($SiO_2$) plus one further very minor unidentified component.

All three samples had a very large amorphous component in their respective diffraction patterns. The largest amorphous indication was given by the dried gel.

Scanning electron microscopy shows that the amorphous material is in the shape of spheroid or avoid particles. These represent the majority, in most cases more than 90% of the reacted material. It is within this silica case that the actual hydrocarbon is enclosed. With the finding of the silica shell as amorphous and analysis of the actual shell showing only silicon and oxygen present, it is evident that this invention does not rely upon adsorption or absorption as do existing methods employing silica or silicate. The actual chemical structure has been found to be a network of Si-O ring formations that are oriented around the acidified, emulsified hydrocarbon particle.

Figure 11:
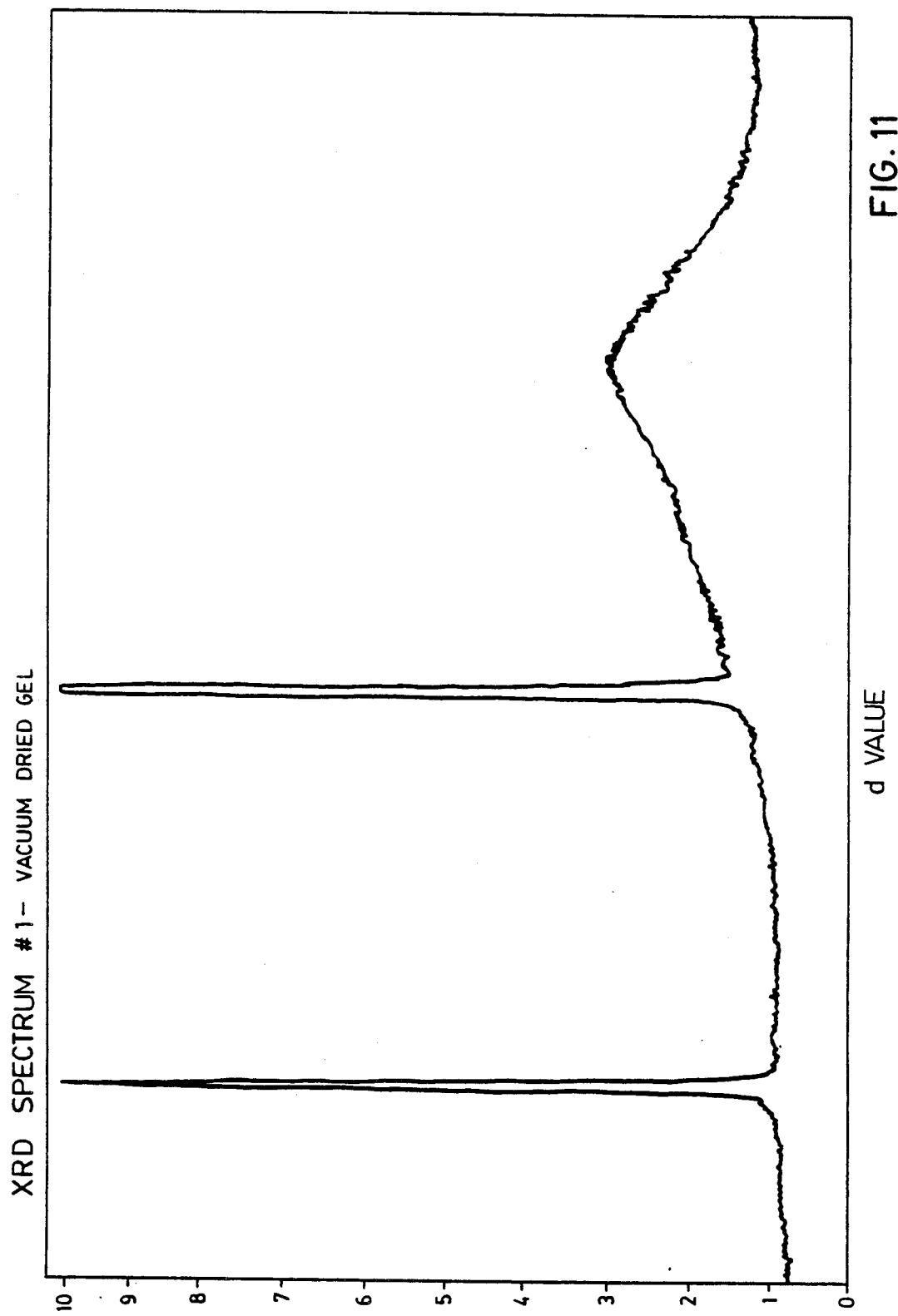
Figure 12:
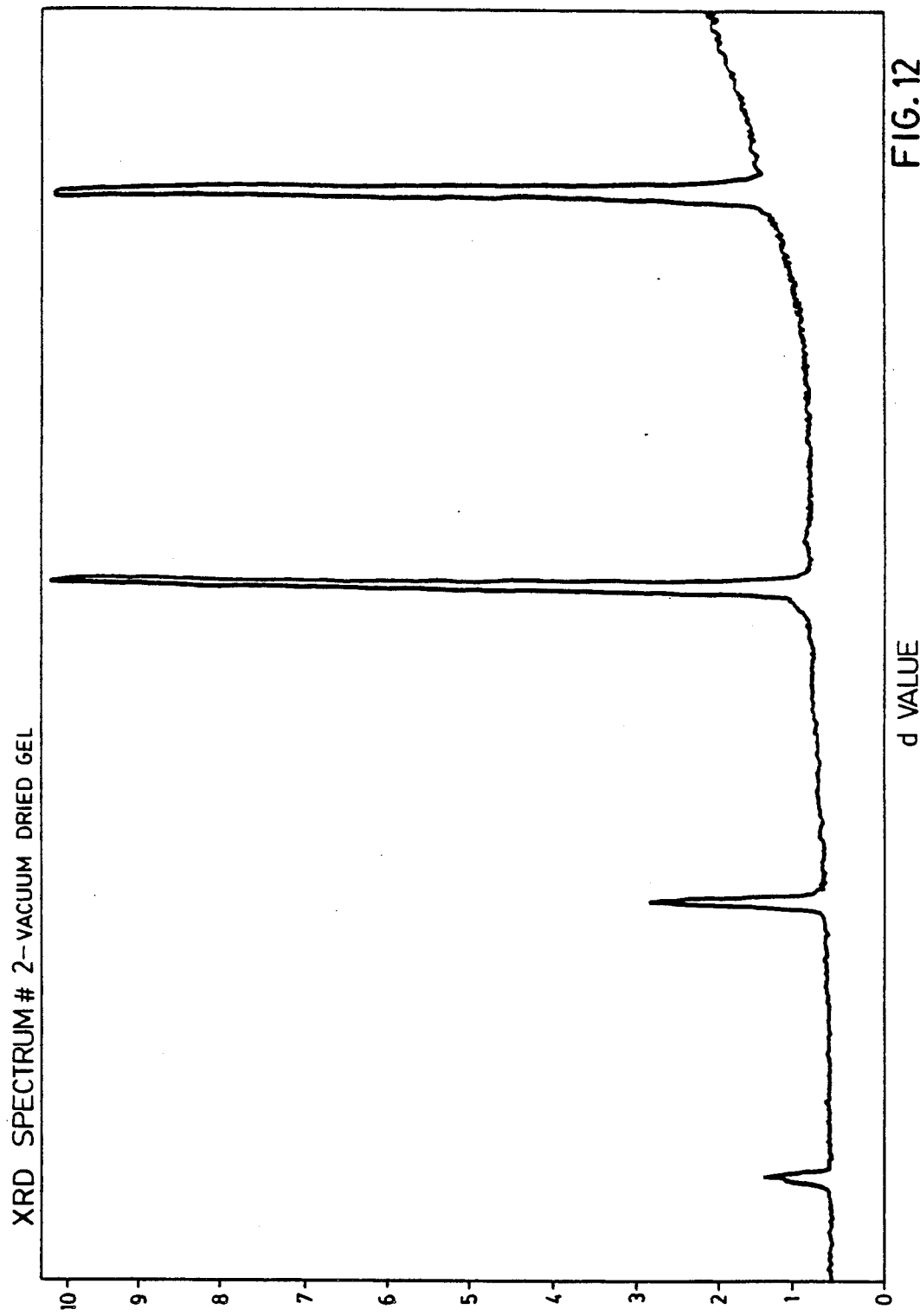
Figure 13:
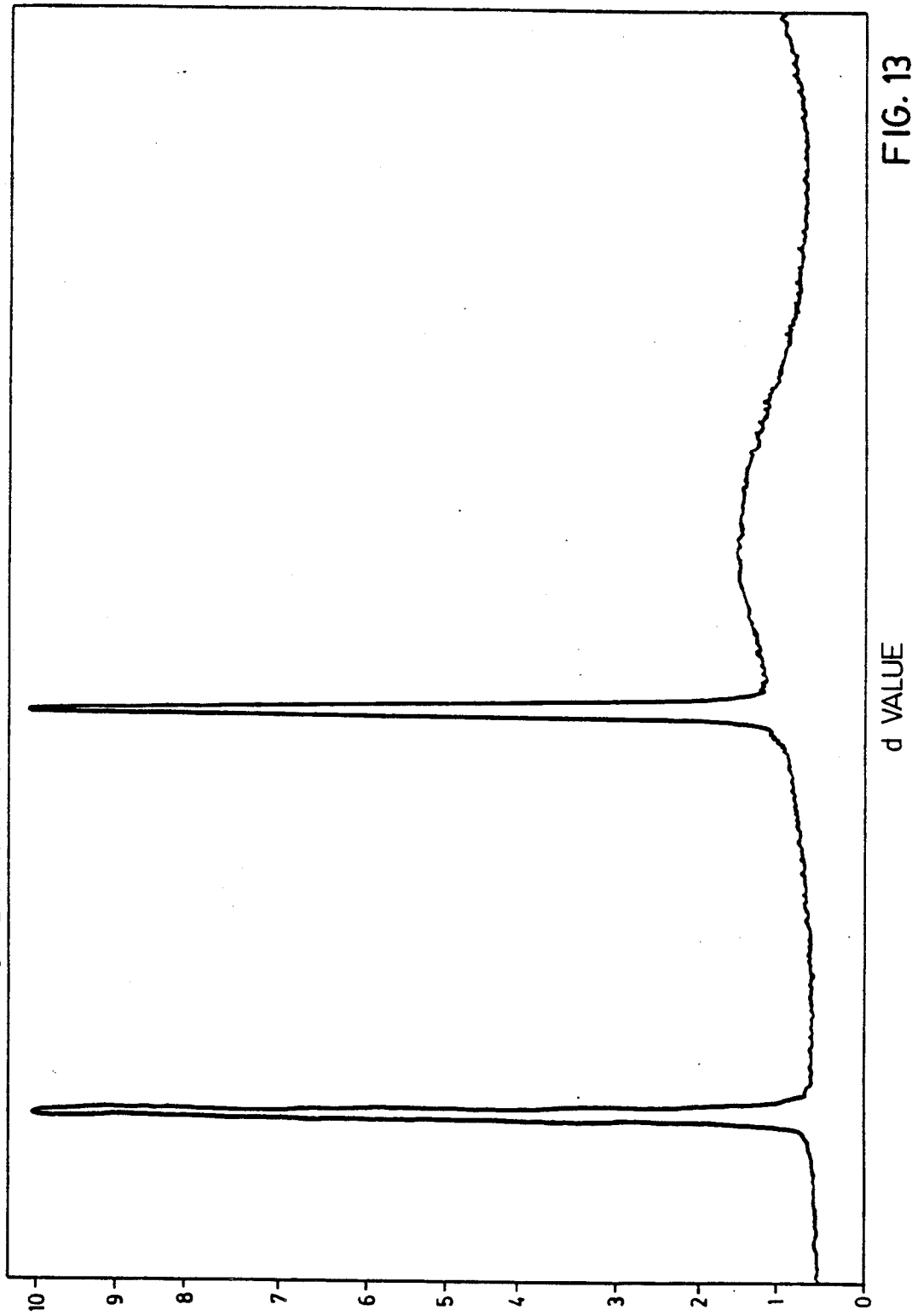

Reduced copies of the diffractometer traces are supplied as XRD Spectra 1,2 and 3 (FIGS. 11, 12 and 13).

Figure 14:
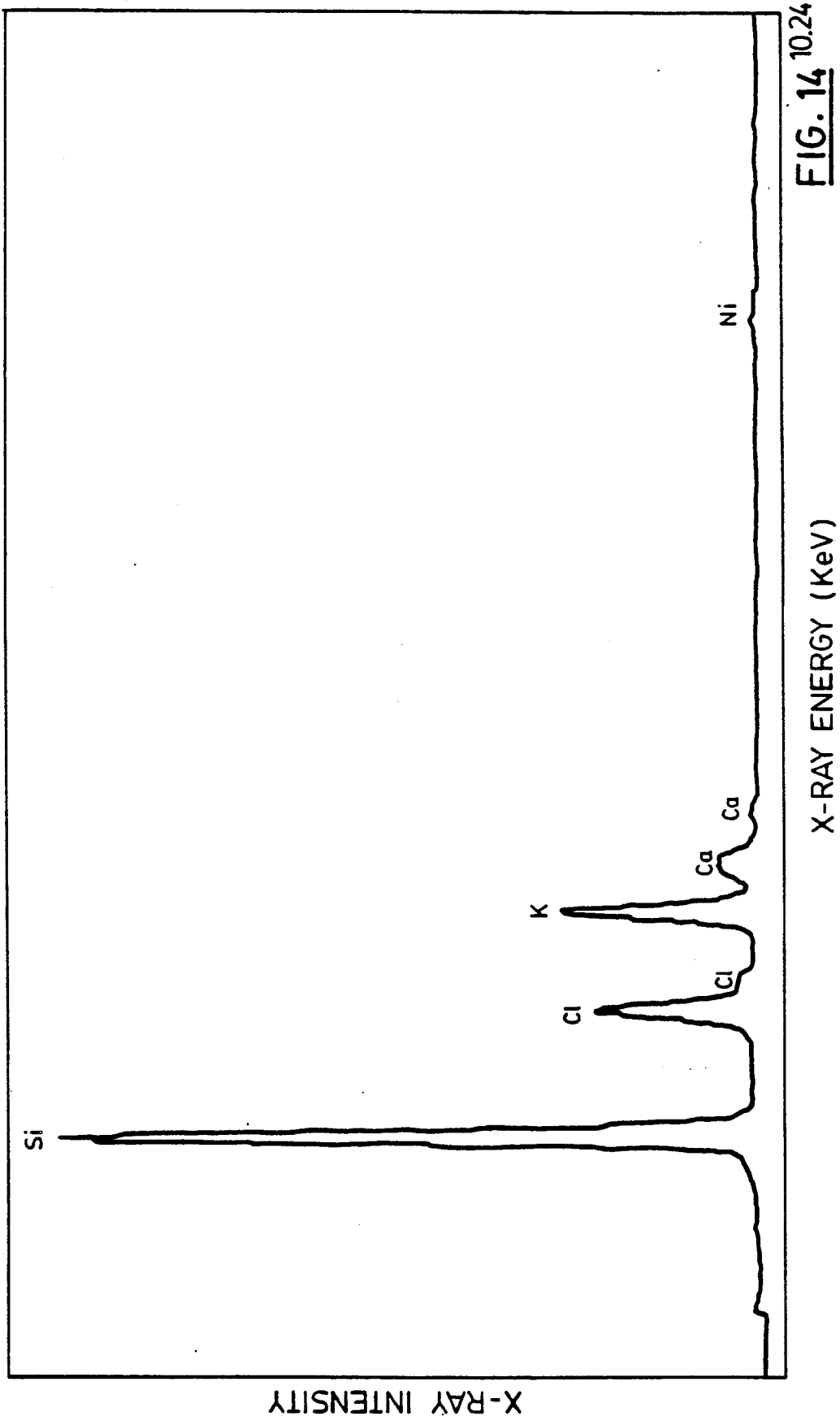

SEM-EDXA analysis of the same three samples analyzed by X-ray techniques again yielded similar results. Energy dispersive X-ray Spectrum 1 (FIG. 14) illustrates the results from the ashed residue of the oil-free gel. Silicon (Si), chlorine (Cl), potassium (K), and Calcium (Ca) are detectable. The nickel (Ni) peak is barely above background and is likely either spurious or represents sample contamination during preparation. The weight percent and atomic percentages calculated from the above EDS spectra are as follows:

| STANDARDLESS EDS ANALYSIS | | |
|---|---|---|
| Element % Line | Weight % | Atomic % |
| Si KA | 42.31 | 55.15 |
| Cl KA | 21.13 | 19.33 |
| K KA | 25.96 | 21.57 |
| Ca KA | 4.06 | 3.29 |
| Ni KA | 1.16 | 0.64 |
| TOTAL | 100.00 | |

Optical microscopy was carried out on the wet gel sample to characterize it further. It was found that the gel consists of clusters of very small spheres. The spheres have a maximum diameter of about 2 to 4 micrometers with a large number being smaller than this.

The clusters of spheres seen are only very loosely bound together. The spheres separated after immersion in glycerine and subjection to dispersive forces by the application of ultrasound. The separated spheres are essentially non-aggregated.

Finally, the weight losses, in duplicate, incurred upon drying of the wet gels were measured to be 46.7% and 44.7% for an average of 45.7% by weight, based on original sample weight. This represents primarily water.

The residual water, as determined by Karl-Fischer titrations in the dried gels was 15.11%, 16.16% and 15.70% for an average of 15.65% based on dry gel weight.

The ash content (total inorganics), based on wet gel weight, was measured to be 10.89% and 10.92% for an average of 10.91%.

The extractable oil content from the dried gel was found to be 34.8%, based on dry sample weight.

EXAMPLE 4

In order to assess the method on a larger scale than possible in a laboratory environment, a 4 foot by 4 foot sand box was constructed. The box was lined with polyethylene film to render it water tight.

The box was then filled with a shallow layer of brine, to a depth of 3 to 4 inches. About two-thirds of the back areas was covered with granite rocks of sizes varying from a few centimeters up to 20 or more centimeters in diameter. This assembly comprised a small scale but still reasonable model of an ocean beach front.

The rocks were then deliberately fouled with crude oil. About two-thirds of a liter of oil was used to accomplish this. A small amount of oil was observed to exude out of the rocks and form an oil slick on the open water.

A dam was built up at the waterline by applying the emulsion solution followed immediately by the silicate solution along a thin strip, about 4 to 5 centimeters wide and parallel to the water's edge.

This dam was intended to form a barrier such that subsequent emulsification of the oil remaining on the landward side would not result in further pollution of the waters.

Upon completion of the barrier formation, the remaining rocks were first treated with the first-mentioned emulsion solution and then with the preferred reactive silicate. A period of several minutes lapsed between the two applications. The solutions were sprayed on at low pressures. No auxiliary aids, such as high pressure steam, were used.

During the carrying out of this example, it was observed that creation of the dam to prevent further fouling of the open water area was entirely successful. No additional contamination due to run off was observed. The oil slick already present on the open water prior to application was observed to undergo breakup due to a small amount of run off of the emulsifier during building of the dam.

Application of the emulsifier to the oil covered rocks rapidly and apparently completely broke up the oil film causing it to run off leaving clean rock behind. A small amount of emulsified oil remained in cracks and crevasses on the rock surfaces. Application of the silicate solution to the emulsified oil converted it into a thick gel. The conversion was almost instantaneous.

The oil gel could be scraped or water-washed off the rock surfaces leaving what appeared to be clean surface behind. This process was simple and easy to accomplish.

When allowed to dry, the gel was even more amenable to subsequent removal by water-washing than when originally formed.

Following water-washing, the rocks dried to a dull, matte finish very reminiscent of their appearance before application of oil. Their surfaces were dry to the touch and gave no evidence of any residual oil film.

EXAMPLE 5

In order to show the versatility of this invention, a variety of hydrocarbons were treated to encapsulate them and were subsequently subjected to leachate analysis.

2 Kg of Bunker "C" oil was mixed with 2.2 Kg of the first-mentioned emulsifier that had been heated to 140° F. This formed a very fluid mix that no longer stuck to the sides of the beaker. To this mix was added 1.8 kg oil silicate solution which immediately formed a thick gel with no evidence of any residual oil film in the beaker. the leachate analysis showed 14 P.P.M. oil in the leach water.

The following hydrocarbons were treated in a similar manner and gave similar results.

| Hydrocarbon | Weight of Hydrocarbon | Weight of Emulsifier | Weight of Silicate | Leachate Analysis |
| --- | --- | --- | --- | --- |
| #2 Diesel Oil | 2.0 kg | 1.75 kg | 2.0 kg | 1.4 P.P.M. |
| Gasoline | 1.0 kg | 0.6 kg | 0.9 kg | 4 P.P.M. |
| Jet Fuel | 2.0 kg | 1.7 kg | 1.9 kg | 9 P.P.M |
| Alberta Crude Oil | 2.0 kg | 2.2 kg | 2.5 kg | 5.2 P.P.M. |
| #4 Diesel Oil | 1.0 kg | 1.0 kg | 1.1 kg | 3.5 P.P.M. |

Thus it may be seen that the disclosed methods provide effective means for treating hazardous wastes, and in particular for treating hydrocarbons.

The principles, preferred embodiments, and modes of operation of the present invention have been described in the foregoing examples. The invention which is intended to be protected herein, however, is not to be construed as limited to a particular form disclosed, since these are to be regarded as illustrative rather than restrictive.

We claim:

1. A method of encapsulating a hydrocarbon to minimize its toxic effect on the environment, comprising:
   mixing the hydrocarbon with an acidic emulsifier to disperse the hydrocarbon into droplets; and
   then, mixing the resultant mixture with an aqueous solution of a water soluble silicate, resulting in the formation of substantially amorphous silica shells surrounding the droplets, wherein the hydrocarbon is not chemically altered or degraded in any way.

2. The method of claim 1 wherein the water soluble silicate is a silicate of an alkali metal.

3. The method of claim 1 wherein the water soluble silicate includes potassium silicate.

4. The method of claim 1, 2 or 3 wherein the emulsifier contains an organic acid.

5. The method of claim 1, 2 or 3 wherein the emulsifier contains an inorganic acid.

6. The method of claim 1, 2 or 3 wherein the emulsifier contains a surface active agent or blend of surface active agents capable of hydrocarbon emulsification.

7. The method of claim 1, 2 or 3 wherein the emulsifier contains a solvent or a blend of solvents capable of forming an aqueous dispersion with the hydrocarbon.

* * * * *

UNITED STATES PATENT AND TRADEMARK OFFICE
CERTIFICATE OF CORRECTION

PATENT NO. : 5,076,938

DATED : December 31, 1991

INVENTOR(S) : William R. Noonan, Thomas K. McDowell

It is certified that error appears in the above-identified patent and that said Letters Patent is hereby corrected as shown below:

Column 9, line 3, should read as follows:

--Titanium Dioxide     .01 to 2.0%--.

Signed and Sealed this

Twenty-third Day of March, 1993

*Attest:*

STEPHEN G. KUNIN

*Attesting Officer*     Acting Commissioner of Patents and Trademarks

UNITED STATES PATENT AND TRADEMARK OFFICE
CERTIFICATE OF CORRECTION

PATENT NO. : 5,076,938

DATED : December 31, 1991

INVENTOR(S) : William R. Noonan and Thomas K. McDowell

It is certified that error appears in the above-identified patent and that said Letters Patent is hereby corrected as shown below:

In col. 2, line 51, between line 48 and the horizontal line please add:

"Another preferred emulsifier has the following composition:".

Signed and Sealed this

Twenty-ninth Day of June, 1993

Attest:

MICHAEL K. KIRK

*Attesting Officer*     Acting Commissioner of Patents and Trademarks